Aug. 8, 1944.   H. W. ADAMS ET AL   2,355,357
HYDRAULIC POWER TRANSMISSION SYSTEM
Filed March 20, 1939   3 Sheets-Sheet 2

INVENTORS.
HAROLD W. ADAMS
EARL S. KLEINHANS
BY J. Edwin Coates
ATTORNEY.

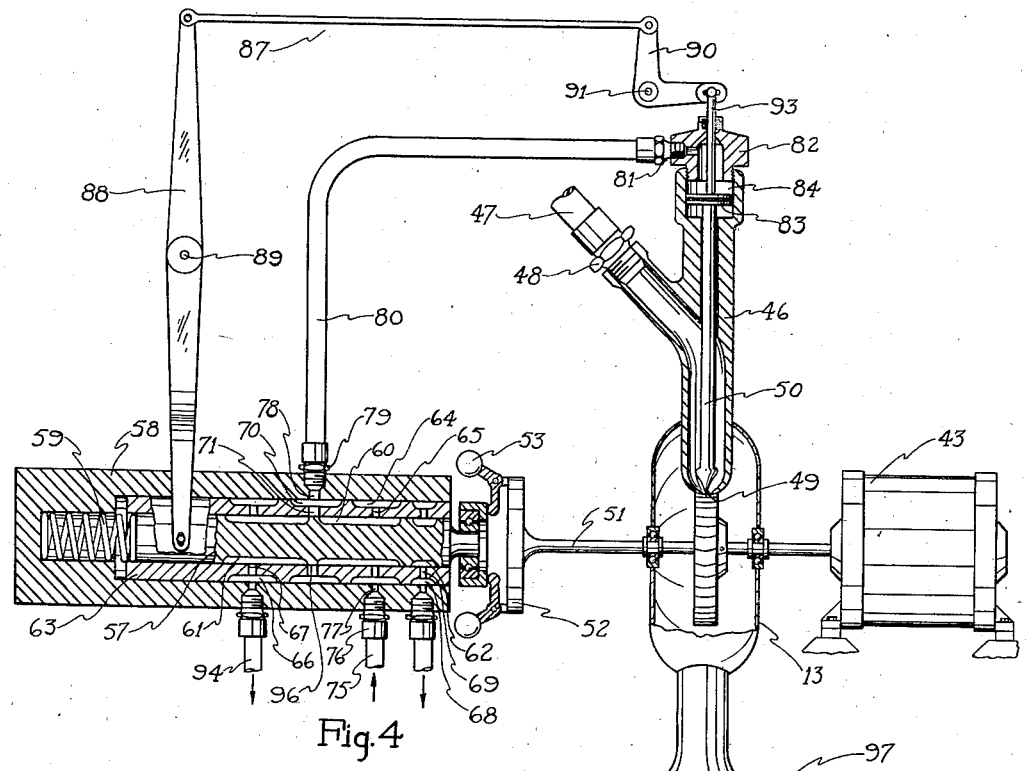
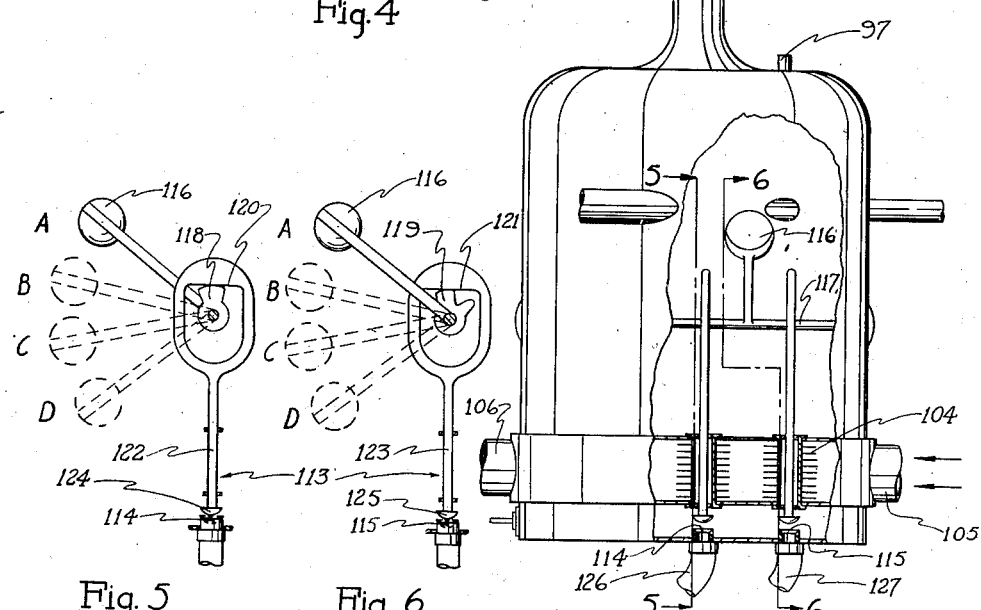

Patented Aug. 8, 1944

2,355,357

UNITED STATES PATENT OFFICE 2,355,357

HYDRAULIC POWER TRANSMISSION SYSTEM

Harold W. Adams and Earl Schuyler Kleinhans, Santa Monica, Calif., assignors to Douglas Aircraft Company, Incorporated, Santa Monica, Calif.

Application March 20, 1939, Serial No. 262,958

6 Claims. (Cl. 60—97)

Our invention relates to a hydraulic transmission system in which pressure fluid is supplied by one or more pumps and is utilized to operate various power transforming units. It has great utility in any installation where it is desired to operate several different types of equipment from a single source of power, and because of its simplicity, compactness and reliability it is particularly desirable for use in moving vehicles.

Many systems of power transmission have been proposed and used in the past, including mechanical, electrical and hydraulic systems and combinations of some of them.

Mechanical systems generally have the disadvantage that there are many moving parts outside the actual units to be operated, which require many additional bearings and careful alignment of parts. Moreover driven units are frequently in locations where it is almost impossible to reach them with a mechanical drive. Where the units to be operated have widely different characteristics, such as a constant speed unit, a variable speed unit and a constant torque unit the difficulty of operating them all from a single source of power is obvious.

Electrical systems overcome some of these disadvantages but have other difficulties of their own. Electric generators normally require a substantially constant speed prime mover. In a moving vehicle, such as an automobile, train or airplane, the driving engine, or prime mover, necessarily runs at a wide range of speeds and is not suitable for driving an electrical generator which is to supply power to anything besides a battery. Hence a separate prime mover is necessary. This adds weight and complication as well as an additional source of possible mechanical failure. Each of the units operated by the electrical system develops heat which must be dissipated at the source. This necessitates as many cooling systems as there are driven units.

Hydraulic systems can be designed to obviate all the difficulties mentioned above and have advantages not obtainable with mechanical or electrical systems. While hydraulic power transmission systems generally are old, we are not aware of any which incorporate the novel features of our invention.

In general the hydraulic system of our invention includes a prime mover, which in the case of a moving vehicle comprises a variable speed motor, a variable delivery hydraulic pump driven by the motor and drawing liquid from a sump or reservoir, a plurality of hydraulically driven units having different characteristics such as constant speed, variable speed and the like, a conduit system extending between the source of power and the driven units, and a pressure fluid accumulator connected to the conduit system for absorbing shock and surge resulting from variation in the demand of the driven units.

A sump or reservoir is provided which is designed to de-aerate the liquid of the hydraulic system by centrifugal force. The sump is also provided with a novel selector valve system for controlling the flow of fluid to any one of several pumps. Leakage of a pump or its associated piping is detected by a float responsive to the liquid level in the sump, the float being adapted to operate a valve to shut off the supply of liquid to the defective pump system.

One of the many advantages of our system is that the heat losses resulting from generation and transmission of energy may be transferred by the hydraulic fluid to a single point, and a single cooling system can therefore serve all the auxilaries.

It is apparent that any number of sources of supply of fluid pressure may be used. In the case of a multi-engined aircraft for example, each of the engines can operate a variable delivery fluid pump and all the pumps can be connected to the same systems so that if any one pump is operating properly there will be an adequate supply of power for the entire group of auxiliaries.

One of the objects of the invention is to provide a substantially unitary power transmission system for operating all auxiliaries, particularly in moving vehicles.

Another object is to provide a power transmission which may operate successfully from any one of several sources of supply.

Another object is to provide a power transmission system which may supply power to relatively inaccessible driven units.

Another object is to provide a unitary power transmission system which is adapted to operate driven units having basically different operating characteristics.

Another object is to provide a power transmission system which simplifies the problem of cooling a plurality of driven units.

Other and further objects and advantages will become apparent as the description proceeds.

The invention is capable of embodiment in a variety of forms, some of which are illustrated in the accompanying drawings, wherein:

Figure 4 is an elevational view, partly in section, showing details of a turbine, an alternator driven thereby, a governor for the turbine, and the fluid sump including its selector valves and cooling system;

Figure 5 is a detailed view of one selector valve of Figure 4, viewed from line 5—5 of Figure 4, and indicating four float controlled positions of said valve in a two valve selector system; and Figure 6 is a detailed view of a second selector valve of Figure 4, viewed from line 6—6 of Figure 4, and indicating four float controlled positions of said valve in a two valve selector system.

Figure 1:
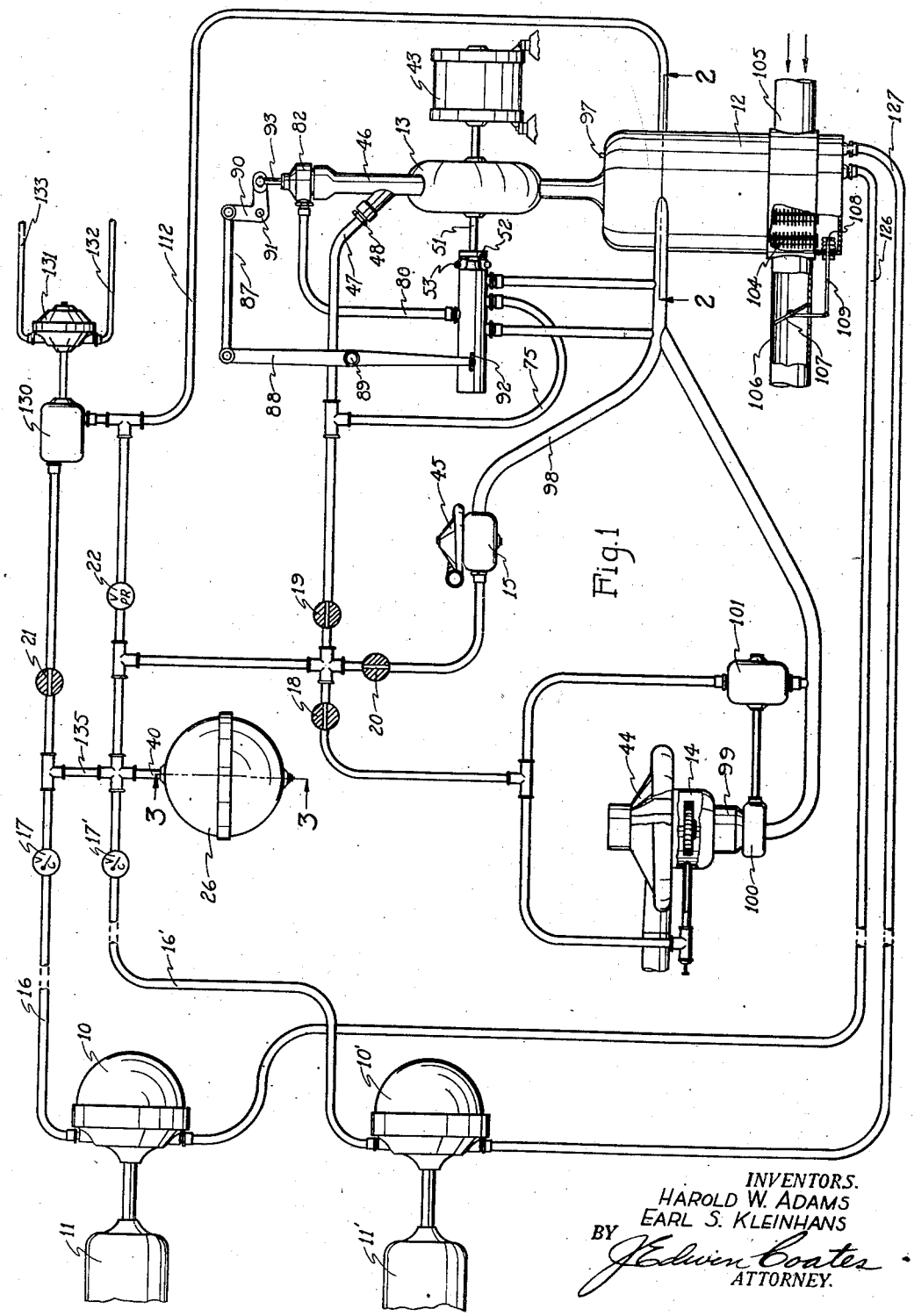
Figure 1 is a schematic diagram of one embodiment of the invention, showing a complete unitary hydraulic transmission system.

Referring now to the drawings:

Figure 1 shows a complete unitary hydraulic system, including prime movers 11, 11', which may be main engines of a multi-engined airplane, fluid pumps 10, 10' driven by the prime movers, a fluid conduit system 16, 16', a pressure fluid accumulator 26, connected to the conduit system, hydraulically driven units, such as 13, 14 and 15, sump 12, and fluid return conduits 126 and 127.

Since the prime movers may be driven at any speed throughout a wide range and one or more may be operating while some are idle, and the demands of the systems may vary without relation to the operation of the prime movers, the pumps 10 and 10' must be capable of supplying varying amounts of fluid at any desired pressure while being driven at any speed, and must all be connected to the same conduit system. The type of pump to be used may be one which discharges a constant volume of liquid at any desired pressure, the excess liquid being by-passed to a sump, or one in which the output is varied by throttling of the intake, or one which is designed to operate with variable displacement, supplying the desired volume of liquid at all times at a predetermined constant pressure. This last type is the one preferred for use in our system at the present time.

Conduits 16 and 16' convey the pressure fluid from the variable delivery pumps to the remainder of the system and are interconnected at 135 so that either conduit can supply the entire system. The supply to any particular unit of the system may be regulated or shut off by means of conventional valves, 18, 19, 20, 21. If the pressure in the system should become excessive for any reason it may be relieved by a safety valve 22 of any desired type the liquid flowing therethrough to return pipe 112. Check valves 17 and 17' serve to prevent return flow from the main system to any of the pumps in case any pump is not operating or its associated piping fails.

A pressure fluid accumulator 26 is incorporated in the conduit system for smoothing out surges and shocks and for supplying a limited amount of pressure fluid to operate auxiliaries when all pumps are idle. This accumulator is preferably but not necessarily located near the motors and their associated pumps.

Figure 3:
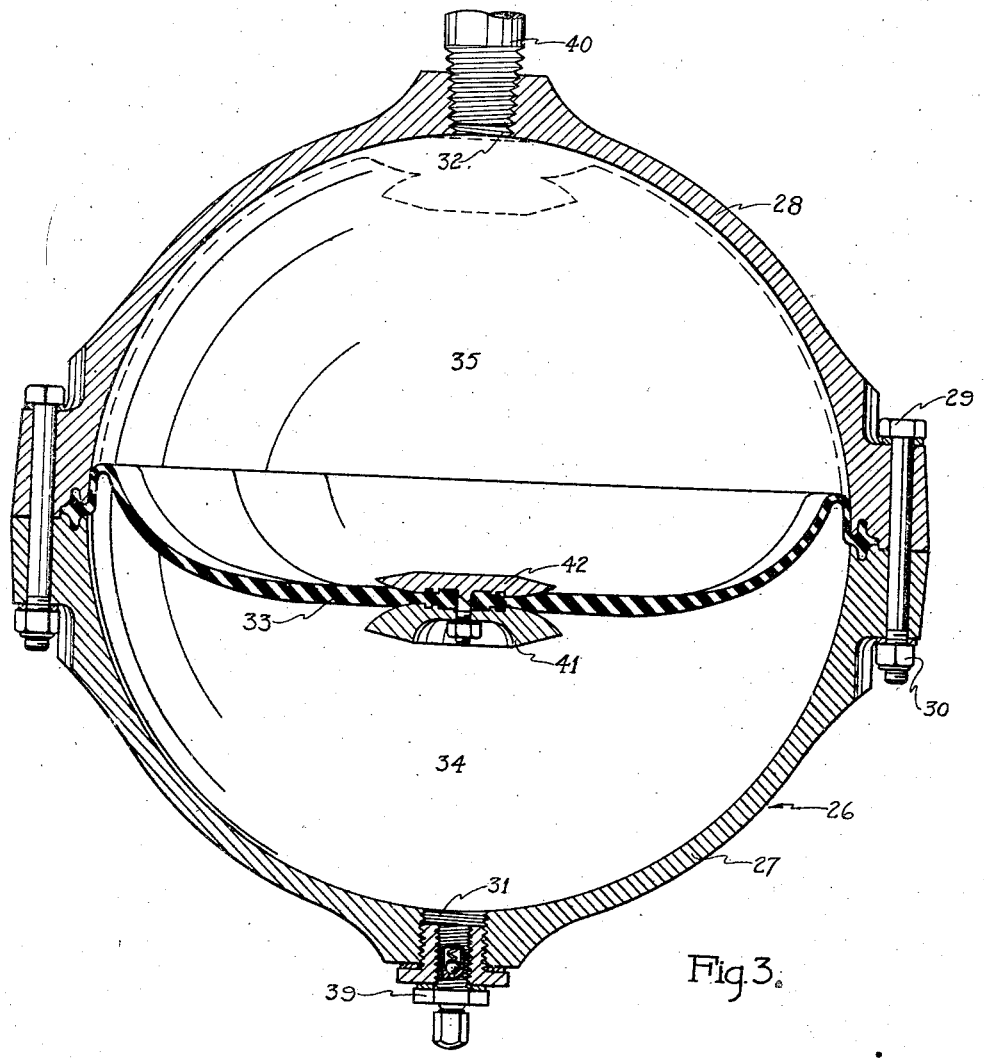
Figure 3 is an enlarged section taken at line 3—3 of Figure 1 and showing the internal construction of the pressure fluid accumulator.

The construction of the accumulator is shown in detail in Figure 3. It is in effect a dual pressure tank made up of two dome-like shells 27 and 28 fastened together around their periphery by any suitable means, such as bolts 29 and nuts 30. These shells are shown as substantially hemispherical in the drawings but obviously may be of any other desired shape which is suitable to withstand the high pressure in the system which may be of the order of 1500 pounds per square inch. A diaphragm 33 having suitable elastic and oil resisting properties is used to separate the tank into a primary chamber 34 and a secondary chamber 35 and to prevent the air from mixing with the liquid. The diaphragm is provided with a circumferential bead which is secured within grooves or recesses formed in the meeting faces of the shells. Shell 27 is provided with a port 31 for entry of air. A check valve 39 is threadedly engaged in the port 31 so that air or other gas may be supplied to chamber 34 and stored therein under pressure. Shell 28 is provided with a port 32 which is connected by means of fitting 40 to the main hydraulic system.

In practice air is stored in chamber 34 under several hundred pounds pressure. Liquid is then supplied to chamber 35 and subjected to the pressure of the main system. Positive pressure surges will be transmitted to the liquid in chamber 35 which chamber will consequently increase in volume, compressing the air in chamber 34 and increasing its pressure. As the surge dies down the diaphragm will return to its normal position and the chambers will regain their normal relative volumes. A negative pressure surge will cause the reverse action, as is apparent. It can be seen that the pressure fluid accumulator thus serves to prevent shocks which might otherwise damage the hydraulic system.

The accumulator also serves as an emergency source of pressure fluid in the event of complete failure of the power-plants or of the pumps. For instance in case of a forced landing of an airplane, it may be used to extend the landing gear, maintain the lighting system in operation, or actuate any safety device with which the airplane may be equipped. It may also serve as a source of supply for operating hydraulic engine starters, etc. Since the air in chamber 34 is under a high initial pressure it may be used to force the oil out of chamber 35 until the entire volume is used up, as indicated by the dotted line position of the diaphragm in Figure 3.

An important feature is the provision of the valve members 41 and 42 in Figure 3. These are attached to the opposite faces of the diaphragm substantially at its center. They may be made of metal or other high strength material. If the diaphragm is forced against either of the vents 31 and 32 during operation the members 41 and 42 will prevent the material of the diaphragm itself from being forced into the vents and thus avoid possible damage. Moreover, should a leak develop in check valve 39 accompanied by some leakage through the diaphragm, member 41 will seat around and seal the vent 31 thus preventing loss of liquid from the system.

The diaphragm is preferably made with the general reverse curved configuration shown in Figure 3. This shape gives a fairly large volume to chamber 34 and at the same time provides sufficient material in the diaphragm to avoid excessive stretching when moved to extreme upper or lower positions as indicated by the dotted lines in Figure 3.

In practice, the diaphragm reaches its fully extended unstretched condition in either direction while member 41 or 42 is still spaced a small distance from vent 31 or 32. This prevents wrinkling in the diaphragm which would allow members 41 or 42 to move off center. Additional movement stretches diaphragm 33 and seats one of the valve members centrally over one of the vents. In order to avoid distortion the diaphragm must be of high quality material and accurately dimensioned. In the diaphragms now in use the thickness at diametrically opposite points is maintained the same within .005 inch.

In modern airplanes and other vehicles various constant speed mechanisms are employed. For instance alternating current is coming into use and it is desirable to maintain the speed of the alternating current generators as constant as possible.

In order to attain the desired degree of accurate regulation of such constant speed units as the alternator 43, a mechanically-hydraulically operable governing unit, the preferred embodiment of which is shown in section Figure 4, can be used advantageously. The liquid enters a nozzle body 46 through a pressure line 47 and a fitting 48 and passes through the body and orifice 49 thereof to drive the turbine 13, there being a longitudinally movable needle 50 for adjusting the size of the orifice.

Attached to the turbine shaft 51 is a conventional governor 52 the fly-balls 53 of which are cooperable with an inner sleeve 57 of a valve body 58 so that radially outward movement of the balls causes the inner sleeve to move away from the governor, motion toward the governor being obtained by a spring return 59. The inner sleeve has three ports, a liquid pressure inlet 60, a liquid return 61 and a bleed port 62 on the opposite side of the pressure inlet from the return. Within the valve body and encasing the inner sleeve, is an outer sleeve 63 which has four ports, an inlet port 64 cooperable with inlet port 60 through a passageway 65, a return port 66 cooperable with return port 61 through a passageway 67, a bleed port 68 cooperable with bleed port 62 through a passageway 69, and an operating port 70 between the inlet and return ports of the outer sleeve cooperable through a passageway 71 with either or neither of the inlet and return ports of the inner sleeve dependent upon the relative positions of the two sleeves. Pressure liquid is conducted to the valve body through a pressure line 75 and a fitting 76 which is cooperable with entry ports 60 and 64 of both inner and outer sleeves through a passageway 77 in the valve body. Pressure liquid is also led from the operating port 70 of the outer sleeve successively through a passageway 78 of the valve body, a fitting 79 threadably connected to the valve body, an operating conduit 80 and a fitting 81 threadably connected to an auxiliary nozzle member 82, and to a piston 83 and cylinder 84 in the nozzle body 46, piston motion causing similar and proportional needle motion. Supplementing the hydraulic control for the orifice is a mechanical follow-up device 87 comprising a linkage, member 88 of which is pivoted at 89 to a fixed support not shown, and member 90 pivoted at 91 to a support also not shown, and operatively connected to the outer sleeve through an opening 92 in the valve body and also by a rod 93 to the needle 50. The cross sectional area of the rod subtracted from the cross sectional area of the piston equals the effective pressure area at the back of the needle, which area is greater than that of the needle itself.

The unit pressure acting upon the areas being substantially uniform, when pressure acts upon the piston, the needle tends to reduce the orifice, but when pressure is effective upon the needle only, the needle tends to increase the orifice, the liquid in the cylinder returning through the valve body to the sump reservoir, and motion of the needle causing the linkage to move the outer sleeve in a direction and distance conforming with the initial movement of the inner sleeve.

In Figure 4, the governing system is shown in a position of stability, wherein the alternator load and therefore the speed of the turbine are constant, the position of the needle relative to the orifice is fixed, the mechanical governor has attained a neutral position, and liquid is trapped within the entry ports of both inner and outer sleeves as well as in the conduit between the operating passageway of the valve body and the recessed cylinder. When the load upon the alternator decreases, the shaft speed tends to increase causing the governor to move the inner sleeve toward the left thereby valving pressure liquid from inlet port 60 of the inner sleeve through operating passageway 71 and port 70 of the outer sleeve to the piston and cylinder, the resultant piston travel moving the needle to reduce the orifice. The needle movement actuates the linkage mechanism in a manner such that the land 96 of the inner sleeve covers the outer sleeve passageway 71, thereby shutting off the supply of pressure and retrapping liquid in the conduit between the operating port 70 and the cylinder 84. The back pressure upon the needle tends to re-open the orifice, which action is prevented by the trapped liquid, and although the position of both sleeves is now changed relative to the valve body, their position relative to each other is again the same, as shown in Figure 4.

When the load upon the alternator increases, the fly-balls move radially inwardly in response to the tendency of the shaft speed to decrease, the return spring 59 moves the inner sleeve rightwardly thereby opening the return port 61 of the inner sleeve to the operating port 70 of the outer sleeve, and the trapped liquid is returned to the sump reservoir by movement of the needle increasing the orifice. The needle movement again actuates the linkage mechanism to retrap liquid between the operating port 70 and the cylinder 84, thereby allowing the needle to remain relatively fixed at that particular setting.

A different type of demand is imposed on the hydraulic system by the cabin supercharger indicated at 44, which is driven in this example by a hydraulic turbine 14. The load on the supercharger and its speed vary with the altitude and the amount of supercharging desired. The rate of fluid flow may be governed manually or automatically depending on the design requirements.

Several of the instruments in an airplane, such as a gyro-compass or gyro-pilot, are driven by a suction pump or evacuator, such as centrifugal pump 45. While the load remains substantially constant at all times the speed of the blower must be increased as the air becomes thinner at high altitudes.

Hence such a device puts a third type of demand on the hydraulic system.

Other types of demands on such a system in an airplane would be deicer pumps running at substantially constant speed and load but operated intermittently and retractable landing gears or flaps which are operated substantially at constant speed but with varying load.

If the pressure required by specific units is other than that of the system pressure, a converter unit can be used to either increase or decrease the pressure, the liquid being drawn from a sump reservoir common to the system or from a source of otherwise suitable supply. If a different liquid is used at the same, or higher or lower pressure than that of the system, a pressure transformer comprising a motor 130 and a pump 131 can be employed to draw liquid from a separate sump reservoir through a conduit 132 and discharge pressure liquid through a conduit 133 to the hydraulic units.

In the system including a plurality of hydraulic motors, a common sump reservoir, which is vented to the atmosphere as at 97, is provided, and there may be return lines as 98 from the motors so positioned that the liquid flows to the sump by force of gravity. There may also be a sump 99 wherefrom liquid is pumped to the sump reservoir by a scavenger pump 100 driven by a motor 101; and a motor may be so located that the liquid falls straightway into the sump reservoir.

A radiator 104 is associated with the sump reservoir for governing the liquid temperature, whereby the heat losses in the system can be dissipated at a convenient location. Air from a source not shown is led to and from the radiator through ducts 105 and 106 within which a thermostatically operable shutter 107 is installed preferably aft of the cooler, the thermostat 108 being located below the liquid level and adapted to actuate the shutter by a link mechanism 109.

Figure 2:
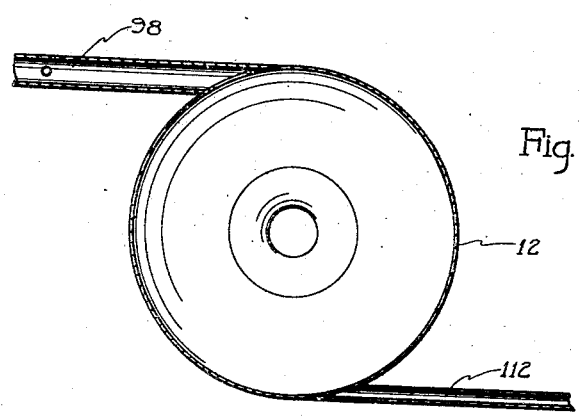
Figure 2 is a section taken at line 2—2 of Figure 1 and showing the means for de-aerating the hydraulic fluid.

As shown in Figure 2, the direction of liquid flow through the return conduits 98 and 112 is substantially tangential to the periphery of the sump reservoir, which arrangement reduces foaming of the liquid within the sump and also expels air from the system, the aeration arising from the normal operation of the turbines.

The system which utilizes a plurality of pumps includes a selector unit 113 whereby liquid flow to the pumps is selectively controlled so that any leaking pump system will shut off as at valve ports 114 and 115. An embodiment of the selector valve for a two-pump system shown in Figures 4—5—6 is operable by the liquid level within the sump reservoir, wherein a float 116 is fastened to a rock-shaft 117 having a single cam 118 and a dual cam 119 arranged in operative relation to faces 120 and 121 of a pair of rods 122 and 213 each of which is adapted to actuate a valve 124 or 125 for controlling a supply of liquid through a conduit 126 or 127 to one of the pumps 10 or 10', whereby the necessary differentially selective actuation of the valve rods is attained.

Figures 5 and 6 show four positions of the float, A, B, C, and D:

Position A: Cams 118 and 119 are in such positions relative to the faces 120 and 121 that valve ports 114 and 115 are open for liquid flow through conduits 126 and 127 to the pumps 10 and 10'.

Position B: In Figure 5, cam 118 is contacting the face 120 of the aperture in the valve rod thereby maintaining port 114 open, and in Figure 6, the cam 119 has revolved from contact with the face 121, thereby permitting valve 125 to seat on port 115.

Position C: In Figure 5, single cam 118 has revolved from contact with face 120, thereby permitting valve 124 to seat on port 114 and in Figure 6, dual cam 119 has revolved to contact face 121, thereby unseating valve 125 from port 115.

Position D: Cams 118 and 119 have revolved from contact with the faces 120 and 121 respectively, thereby permitting valves 124 and 125 to seat on ports 114 and 115.

In operation, if the liquid in the sump reservoir falls below the normal level, port 115 closes the conduit 127 leading to a pump system and at least temporarily discontinues functioning of the respective pump 10'. If the level continues to fall; port 114 closes and the pump 10 ceases to function, port 115 re-opens and the initially discontinued pump system resumes operations. If the level continues to fall; ports 114 and 115 will close and functioning of the controlled system will cease pending the necessary repairs.

It will be evident from the preceding description that our invention possesses numerous novel features and advantages which are of great utility in the field of power transmission.

Primarily we have devised a power transmission system which is fundamentally as reliable as the main power plants or prime movers. We have devised a system which may take its power from all the prime movers available or may rely on any one of them, should the others cease to operate for any reason. Our system takes the equivalent of a single power source and transmits it to any number of driven units regardless of the type of demand they impose. It incorporates safety devices and an emergency or reserve source of supply. It eliminates the necessity for individual cooling or ventilation of each of the driven units. It is more compact and convenient and easier to install and maintain than any comparable prior art system of which we are aware. Because of these features it is also lighter in weight and more efficient in operation.

While we have shown a preferred embodiment in considerable detail and described it at length, it is obvious that many changes may be made in the details of construction and specific arrangement of parts without departing from the spirit of the invention and we aim to cover all such changes and modifications in the appended claims.

We claim:

1. A hydraulic power transmission system including a plurality of pump means adapted to supply fluid under pressure, a hydraulically driven unit, sump means and a closed conduit system interconnecting the pump means, the driven unit and the sump means, and selector valve means responsive to the liquid level in the sump and operative to selectively control the flow of fluid from the sump means to the pump means.

2. A hydraulic power transmission system including a plurality of independently operating prime movers operating at widely varying speeds and adapted to drive a vehicle directly, separate pump means actuated by each of said prime movers and adapted to supply fluid at constant pressure and in variable volume regardless of the speed of their respective prime movers, a hydraulic conduit system interconnecting said pump means, and a plurality of hydraulically driven units operatively connected to said hydraulic system and imposing different types of demands thereon, each of the pump means being adapted to supply all demands simultaneously regardless of the operation of any other pump means.

3. A hydraulic power transmission system including a plurality of independently operating prime movers operating at widely varying speeds and adapted to drive a vehicle directly, separate pump means actuated by each of said prime movers and adapted to supply fluid at constant pressure and in variable volume regardless of the speed of their respective prime movers, a hydraulic conduit system interconnecting said pump means, a hydraulic pressure fluid accumulator in operative communication with the fluid in said conduit system, and a plurality of hydraulically driven units operatively connected to said hydraulic system and imposing different types of demands thereon, each of the pump means being adapted to supply all demands simultaneously regardless of the operation of any other pump means, said accumulator serving to minimize surge and shock resulting from variable operation and also supplying power for emergency operation when all pump means are out of operation.

4. A hydraulic power transmission including a plurality of pump means adapted to supply fluid under pressure, a plurality of hydraulically driven units, sump means connected to said driven units, separate conduits connecting said sump means to each of said pump means, and selector valve means responsive to the liquid level in the sump means and operative to selectively control the return flow of liquid through each of the conduits from the sump means to the pump means.

5. In a hydraulic power transmission system, a plurality of interconnected sources of fluid under pressure, a plurality of isolated hydraulically driven units connected to said sources of fluid under pressure, sump means connected to said units to receive exhaust fluid therefrom, separate conduits for conducting fluid from said sump means to said respective sources of fluid under pressure, a de-aerating means, a heat exchanger and selector valve means being incorporated in said sump, said selector valve means being responsive to liquid level in said sump to control the flow of fluid through said conduits.

6. In a hydraulic power transmission system, a plurality of pump means for supplying fluid under pressure, hydraulically driven motor means, high pressure conduit means connecting the high pressure side of said motor means simultaneously to said plurality of pump means, a sump means connected to the low pressure side of said motor means, separate return conduits connecting said sump means to said plurality of pump means respectively, selector valve means responsive to the liquid level in the sump means, operative at a high predetermined level to open all of said return conduits, at each of a succession of progressively lower predetermined levels to shut off a different one only of said return conduits and at a lowermost level to shut off all of said return conduits.

HAROLD W. ADAMS.
EARL SCHUYLER KLEINHANS.